US012557814B2

(12) United States Patent
Jin

(10) Patent No.: US 12,557,814 B2
(45) Date of Patent: Feb. 24, 2026

(54) HERBICIDAL COMPOSITION AND METHOD FOR CONTROLLING WEEDS

(71) Applicant: SUMITOMO CHEMICAL COMPANY, LIMITED, Chuo-ku (JP)

(72) Inventor: Yoshinobu Jin, Kasai (JP)

(73) Assignee: SUMITOMO CHEMICAL COMPANY, LIMITED, Chuo-ku (JP)

( * ) Notice: Subject to any disclaimer, the term of this patent is extended or adjusted under 35 U.S.C. 154(b) by 741 days.

(21) Appl. No.: 17/295,310

(22) PCT Filed: Dec. 3, 2019

(86) PCT No.: PCT/JP2019/047172
§ 371 (c)(1),
(2) Date: May 19, 2021

(87) PCT Pub. No.: WO2020/116430
PCT Pub. Date: Jun. 11, 2020

(65) Prior Publication Data
US 2022/0007647 A1 Jan. 13, 2022

(30) Foreign Application Priority Data
Dec. 7, 2018 (JP) ................................ 2018-229701

(51) Int. Cl.
*A01N 43/84* (2006.01)
*A01N 25/32* (2006.01)
*A01N 43/54* (2006.01)
*A01N 43/56* (2006.01)
*A01N 43/80* (2006.01)
*A01N 57/20* (2006.01)
*A01P 13/00* (2006.01)

(52) U.S. Cl.
CPC ............. *A01N 43/84* (2013.01); *A01N 25/32* (2013.01); *A01N 43/54* (2013.01); *A01N 43/56* (2013.01); *A01N 43/80* (2013.01); *A01N 57/20* (2013.01); *A01P 13/00* (2021.08)

(58) Field of Classification Search
CPC ........ A01N 43/84; A01N 25/32; A01N 43/54; A01N 43/56; A01N 43/80; A01N 57/20; A01N 43/50; A01P 13/00
See application file for complete search history.

(56) References Cited

U.S. PATENT DOCUMENTS

| | | | |
|---|---|---|---|
| 4,608,079 | A | 8/1986 | Los |
| 9,220,268 | B2 | 12/2015 | Witschel. et al. |
| 2012/0100991 | A1 | 4/2012 | Witschel et al. |
| 2014/0243522 | A1 | 8/2014 | Witschel et al. |
| 2015/0126369 | A1 | 5/2015 | Bristow |
| 2015/0250181 | A1 | 9/2015 | Witschel et al. |
| 2015/0342193 | A1 | 12/2015 | Simon et al. |
| 2016/0295866 | A1 | 10/2016 | Steinbrenner et al. |
| 2017/0029383 | A1 | 2/2017 | Major et al. |
| 2019/0208784 | A1 | 7/2019 | Armel et al. |
| 2019/0254277 | A1 | 8/2019 | Jin |
| 2019/0281825 | A1 | 9/2019 | Jin |
| 2020/0000093 | A1 | 1/2020 | Jin |

FOREIGN PATENT DOCUMENTS

| | | | |
|---|---|---|---|
| CN | 105230636 | A | 1/2016 |
| CN | 105230637 | A | 1/2016 |
| CN | 105248431 | A | 1/2016 |
| CN | 105265459 | A | 1/2016 |
| CN | 105284830 | A | 2/2016 |
| CN | 105284831 | A | 2/2016 |
| CN | 105284845 | A | 2/2016 |
| CN | 105284852 | A | 2/2016 |
| CN | 105409973 | A | 3/2016 |
| CN | 105410003 | A | 3/2016 |
| CN | 105724003 | A | 7/2016 |
| CN | 105724451 | A | 7/2016 |
| CN | 107455381 | A | 12/2017 |
| CN | 107980783 | A | 5/2018 |
| JP | 2012-530098 | A | 11/2012 |
| JP | 2016-501911 | A | 1/2016 |
| JP | 2017-501125 | A | 1/2017 |
| WO | WO 2012/146623 | A1 | 11/2012 |
| WO | WO 2013/174693 | A1 | 11/2013 |
| WO | WO 2013/174694 | A1 | 11/2013 |
| WO | WO 2015/071087 | A1 | 5/2015 |
| WO | WO 2017/202774 | A1 | 11/2017 |
| WO | WO 2019/158378 | A1 | 8/2019 |
| WO | WO 2020/025371 | A1 | 2/2020 |

OTHER PUBLICATIONS

CN 105248431 A machine translation (Year: 2016).*
International Search Report issued on Mar. 3, 2020 in PCT/JP2019/047172 filed on Dec. 3, 2019, 4 pages.
Sharpen product label, BASF Corporation, Research Triangle Park , NC., 2011, pp. 1-19.

* cited by examiner

*Primary Examiner* — Ali Soroush
*Assistant Examiner* — Andriae M Holt
(74) *Attorney, Agent, or Firm* — Oblon, McClelland, Maier & Neustadt, L.L.P.

(57) ABSTRACT

The present invention relates to a herbicidal composition including trifludimoxazin and at least one compound selected from the group consisting of a herbicide compound group B and a safener group C, wherein a weight ratio of trifludimoxazin to the at least one compound selected from the group consisting of the herbicide compound group B and the safener group C is 1:0.1 to 1:50. According to the present invention, the herbicidal composition having an excellent controlling effect on weeds can be provided.

1 Claim, No Drawings

HERBICIDAL COMPOSITION AND METHOD FOR CONTROLLING WEEDS

CROSS REFERENCE TO RELATED APPLICATIONS

The present application is a national stage application of PCT/JP2019/047172, filed Dec. 3, 2019, the content of which is incorporated by reference in its entirety herein. This application claims benefit of Japanese application 2018-229701, filed Dec. 7, 2018, the content of which is incorporated herein in its entirety. This application is related to U.S. application Ser. No. 16/850,429, filed Apr. 16, 2020.

TECHNICAL FIELD

This application claims priority to and the benefit of Japanese Patent Application No. 2018-229701 filed on Dec. 7, 2018, the entire contents of which are incorporated herein by reference.

The present invention relates to a herbicidal composition and a method for controlling weeds.

BACKGROUND ART

A number of herbicides are currently sold and used. Many PPO-inhibiting herbicides are used for controlling weeds. For example, trifludimoxazin is known as a benzoxazine compound having herbicidal activity.

CITATION LIST

Patent Documents

Patent Document 1: WO 2010/145992
Patent Document 2: WO 2012/080239
Patent Document 3: EP 2 868 196 A
Patent Document 4: EP 2 868 197 A
Patent Document 5: US 2016/0,057,999 A
Patent Document 6: US 2016/0,058,000 A

NON-PATENT DOCUMENT

Non-Patent Document 1: "Herbicidally active combinations comprising trifludimoxazin", An IP.com Prior Art Database Technical Disclosure, IP.com Number: IPCOM000242938D

SUMMARY OF THE INVENTION

Problems to be Solved by the Invention

An object of the present invention is to provide a herbicidal composition and a method for controlling weeds which have an excellent controlling effect on weeds.

Means for Solving the Problems

In the present invention, it has been found that an excellent controlling effect on weeds is exhibited by using trifludimoxazin (Formula (I) shown below) and a specific compound in combination.

Formula (I)

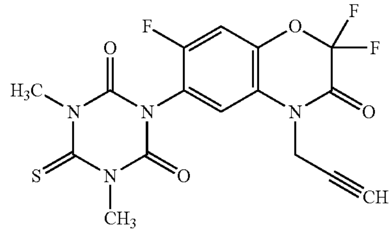

The present invention includes the following.

[1] A herbicidal composition including trifludimoxazin and at least one compound selected from the group consisting of a herbicide compound group B and a safener group C, wherein a weight ratio of trifludimoxazin to the at least one compound selected from the group consisting of the herbicide compound group B and the safener group C is 1:0.1 to 1:50, and the herbicide compound group B is a group consisting of the following B-1 to B-12:

B-1 acetolactate synthase inhibitors;
B-2 acetyl-CoA carboxylase inhibitors;
B-3 protoporphyrinogen IX oxidase inhibitors;
B-4 4-hydrophenylpyruvate dioxygenase inhibitors;
B-5 phytoene desaturase inhibitors;
B-6 photosystem II inhibitors;
B-7 very long chain fatty acid synthesis inhibitors;
B-8 microtubule formation inhibitors;
B-9 auxin herbicides;
B-10 enolpyruvylshikimate 3-phosphate synthase inhibitors;
B-11 glutamine synthase inhibitors; and
B-12 other herbicides (including agriculturally acceptable salts or derivatives thereof).

[2] The herbicidal composition according to [1], wherein the B-1 is a group consisting of pyrithiobac, pyrithiobac-sodium salt, pyriminobac, pyriminobac-methyl, bispyribac, bispyribac-sodium salt, pyribenzoxim, pyrimisulfan, pyriftalid, triafamone, amidosulfuron, azimsulfuron, bensulfuron, bensulfuron-methyl, chlorimuron, chlorimuron-ethyl, cyclosulfamuron, ethoxysulfuron, flazasulfuron, flucetosulfuron, flupyrsulfuron, flupyrsulfuron-methyl-sodium, foramsulfuron, halosulfuron, halosulfuron-methyl, imazosulfuron, mesosulfuron, mesosulfuron-methyl, metazosulfuron, nicosulfuron, orthosulfamuron, oxasulfuron, primisulfuron, primisulfuron-methyl, propyrisulfuron, pyrazosulfuron, pyrazosulfuron-ethyl, rimsulfuron, sulfometuron, sulfometuron-methyl, sulfosulfuron, trifloxysulfuron, trifloxysulfuron-sodium salt, chlorsulfuron, cinosulfuron, ethametsulfuron, ethametsulfuron-methyl, iodosulfuron, iodosulfuron-methyl-sodium, iofensulfuron, iofensulfuron-sodium, metsulfuron, metsulfuron-methyl, prosulfuron, thifensulfuron, thifensulfuron-methyl, triasulfuron, tribenuron, tribenuron-methyl, triflusulfuron, triflusulfuron-methyl, tritosulfuron, bencarbazone, flucarbazone, flucarbazone-sodium salt, propoxycarbazone, propoxycarbazone-sodium salt, thiencarbazone, thiencarbazone-methyl, cloransulam, cloransulam-methyl, diclosulam, florasulam, flumetsulam, metosulam, penoxsulam, pyroxsulam, imazamethabenz, imazamethabenz-methyl, imazamox, imazamox-ammonium salt, imazapic, imazapic-ammonium salt, imazapyr, imazapyr-isopropylammonium salt, imazaquin, imazaquin-ammonium, imazethapyr, and imazethapyr-ammonium salt (including agriculturally acceptable salts and derivatives thereof), the B-2 is a group consisting of clodinafop, clodinafop-propargyl, cyhalofop, cyhalofop-butyl, diclofop, diclofop-methyl, fenoxaprop, fenoxaprop-ethyl, fenoxaprop-P, fenoxaprop-P-ethyl, fluazifop, fluazifop-butyl, fluazifop-P, fluazifop-P-butyl, haloxyfop, haloxyfop-methyl, haloxyfop-P, haloxyfop-P-methyl, metamifop, propaquizafop, quizalofop, quizalofop-ethyl, quizalofop-P, quizalofop-P-ethyl, alloxydim, clethodim, sethoxydim, tepraloxydim, tralkoxydim, and pinoxaden (including agricultural salts and derivatives thereof), the B-3 is a group consisting of azafenidin, oxadiazon, oxadiargyl, carfentrazone, carfentrazone-ethyl, saflufenacil, cinidon, cinidon-ethyl, sulfentrazone, pyraclonil, pyraflufen, pyraflufen-ethyl, butafenacil, fluazolate, fluthiacet, fluthiacet-methyl, flufenpyr, flufenpyr-ethyl, flumiclorac, flumiclorac-pentyl, flumioxazin, pentoxazone, oxyfluorfen, acifluorfen, acifluorfen-sodium salt, aclonifen, chlormethoxynil, chlornitrofen, nitrofen, bifenox, fluoroglycofen, fluoroglycofen-ethyl, fomesafen, fomesafen-sodium salt, lactofen, tiafenacil, and ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy] acetate (including agricultural salts and derivatives thereof), the B-4 is a group consisting of benzobicyclon, bicyclopyrone, mesotrione, sulcotrione, tefuryltrione, tembotrione, isoxachlortole, isoxaflutole, benzofenap, pyrasulfotole, pyrazolynate, pyrazoxyfen, fenquinotrione, topramezone, tolpyralate, lancotrione, lancotrione-sodium salt, 2-methyl-N-(5-methyl-1,3,4-oxadiazol-2-yl)-3-(methylsulfonyl)-4-(trifluoromethyl) benzamide (CAS Registry Number: 1400904-50-8), 2-chloro-N-(1-methyl-1H-tetrazol-5-yl)-3-(methylthio)-4-(trifluoromethyl)benzamide (CAS Registry Number: 1361139-71-0), and 4-(4-fluorophenyl)-6-[(2-hydroxy-6-oxo-1-cyclohexane-1-yl)carbonyl]-2-methyl-1,2,4-triazine-3,5(2H,4H)-dione (CAS Registry Number: 1353870-34-4)

(including agricultural salts and derivatives thereof), the B-5 is a group consisting of diflufenican, picolinafen, beflubutamid, norflurazon, fluridone, flurochloridone, and flurtamone (including agricultural salts and derivatives thereof), the B-6 is a group consisting of ioxynil, ioxynil-octanoate, bentazone, pyridate, bromoxynil, bromoxynil-octanoate, chlorotoluron, dimefuron, diuron, linuron, fluometuron, isoproturon, isouron, tebuthiuron, benzthiazuron, methabenzthiazuron, propanil, metobromuron, metoxuron, monolinuron, siduron, simazine, atrazine, propazine, cyanazine, ametryn, simetryn, dimethametryn, prometryn, terbumeton, terbuthylazine, terbutryn, trietazine, hexazinone, metamitron, metribuzin, amicarbazone, bromacil, lenacil, terbacil, chloridazon, desmedipham, and phenmedipham (including agricultural salts and derivatives thereof), the B-7 is a group consisting of propachlor, metazachlor, alachlor, acetochlor, metolachlor, S-metolachlor, butachlor, pretilachlor, thenylchlor, indanofan, cafenstrole, fentrazamide, dimethenamid, dimethenamid-P, mefenacet, pyroxasulfone, fenoxasulfone, naproanilide, napropamide, anilofos, flufenacet, and ipfencarbazone (including agricultural salts and derivatives thereof), the B-8 is a group consisting of trifluralin, pendimethalin, ethalfluralin, benfluralin, oryzalin, prodiamine, butamifos, dithiopyr, and thiazopyr (including agricultural salts and derivatives thereof), the B-9 is a group consisting of 2,4-DB and its salts or esters (dimethylammonium salt, isooctyl ester, and choline salt), MCPA and its salts or esters (dimethylammonium salt, 2-ethylhexyl ester, isooctyl ester, sodium salt, and choline salt), MCPB, mecoprop and its salts or esters (dimethylammonium salt, dioramine salt, ethadyl ester, 2-ethylhexyl ester, isooctyl ester, methyl ester, potassium salt, sodium salt, trolamine salt, and choline salt), mecoprop-P and its salts or esters (dimethylammonium salt, 2-ethylhexyl ester, isobutyl salt, potassium salt, and choline salt), dichlorprop and its salt or ester (butotyl ester, dimethylammonium salt, 2-ethylhexyl ester, isooctyl ester, methyl ester, potassium salt, sodium salt, and choline salt), dichlorprop-P, dichlorprop-P dimethylammonium, triclopyr and its salts or esters (butotyl ester, and triethylammonium salt), fluroxypyr, fluroxypyr-meptyl, picloram and its salts (potassium salt, tris(2-hydroxypropyl)ammonium salt, and choline salt), quinclorac, quinmerac, aminopyralid and its salts (potassium salt, tris(2-hydroxypropyl)ammonium salt, and choline salt), clopyralid and its salts (olamine salt, potassium salt, triethylammonium salt, and choline salt), clomeprop, aminocyclopyrachlor, halauxifen, halauxifen-methyl, florpyrauxifen, and florpyrauxifen-benzyl (including agricultural salts and derivatives thereof), the B-10 is a group consisting of glyphosate, glyphosate-isopropylammonium salt, glyphosate-trimesium salt, glyphosate-ammonium salt, glyphosate-diammonium salt, glyphosate-dimethylammonium salt, glyphosate-monoethanolamine salt, glyphosate-sodium salt, glyphosate-potassium salt, and glyphosate-guanidine salt (including agricultural salts and derivatives thereof), the B-11 is a group consisting of glufosinate, glufosinate-ammonium salt, glufosinate-P, glufosinate-P-sodium salt, and bialaphos (including agricultural salts and derivatives thereof), and the B-12 is a group consisting of isoxaben, dichlobenil, methiozolin, diallate, butylate, triallate, chlorpropham, asulam, phenisopham, benthiocarb, molinate, esprocarb, pyributicarb, prosulfocarb, orbencarb, EPTC, dimepiperate, swep, difenoxuron, methyldymron, bromobutide, daimuron, cumyluron, diflufenzopyr, diflufenzopyr-sodium salt, etobenzanid, tridiphane, amitrole, clomazone, 2-[(2,4-dichlorophenyl)methyl]-4,4-dimethylisoxazolidin-3-one (CAS Registry Number: 81777-95-9) (3S,4S)—N-(2-fluorophenyl)-1-methyl-2-oxo-4-[3-(trifluoromethyl)phenyl]-3-pyrrolidinecarboxamide (CAS Registry Number: 2053901-33-8), maleic hydrazide, oxaziclomefone, cinmethylin, benfuresate, ACN, dalapon, chlorthiamid, flupoxam, bensulide, paraquat, paraquat-dichloride, diquat, diquat-dibromide, MSMA, indaziflam, and triaziflam (including agricultural salts and derivatives thereof).

[3] The herbicidal composition according to [1] or [2], wherein the safener group C is a group consisting of benoxacor, cloquintocet, cyometrinil, cyprosulfamide, dichlormid, dicyclonone, dietholate, fenchlorazole, fenclorim, flurazole, fluxofenim, furilazole, isoxadifen, mefenpyr, mephenate, naphthalic anhydride, oxabetrinil, 4-(dichloroacetyl)-1-oxa-4-azaspiro[4.5]decane, 2,2,5-trimethyl-3-(dichloroacetyl)-1,3-oxazolidine, and N-(2-methoxybenzoyl)-4-[(methylaminocarbonyl) amino]benzenesulfon-amide.

[4] The herbicidal composition according to [1], wherein the B-1 is a group consisting of pyrithiobac, pyrithiobac-sodium salt, chlorimuron-ethyl, foramsulfuron, halosulfuron-methyl, nicosulfuron, primisulfuron-methyl, rimsulfuron, trifloxysulfuron-sodium salt, chlorsulfuron, iodosulfuron-methyl-sodium, iofensulfuron sodium, metsulfuron-methyl, prosulfuron, thifensulfuron-methyl, tribenuron-methyl, thiencarbazone-methyl, cloransulam-methyl, flumetsulam, imazamethabenz-methyl, imazamox-ammonium salt, imazapic-ammonium salt, imazapyr-isopropylammonium, imazaquin-ammonium salt, and imazethapyr-ammonium salt (including agriculturally acceptable salts and derivatives thereof).

[5] The herbicidal composition according to [1], wherein the B-2 is a group consisting of fenoxaprop-ethyl, fenoxaprop-P-ethyl, fluazifop-butyl, fluazifop-P-butyl, quizalofop-ethyl, quizalofop-P-ethyl, clethodim, and sethoxydim (including agriculturally acceptable salts and derivatives thereof).

[6] The herbicidal composition according to [1], wherein the B-3 is a group consisting of carfentrazone-ethyl, saflufenacil, sulfentrazone, pyraflufen-ethyl, fluthiacet-methyl, flufenpyr-ethyl, flumiclorac-pentyl, flumioxazin, oxyfluorfen, acifluorfen-sodium salt, fomesafen-sodium salt, lactofen, tiafenacil, and ethyl [(3-{2-chloro-4-fluoro-5-[3-methyl-4-(trifluoromethyl)-2,6-dioxo-1,2,3,6-tetrahydropyrimidine-1-yl]phenoxy}pyridin-2-yl)oxy]acetate (including agriculturally acceptable salts and derivatives thereof).

[7] The herbicidal composition according to [1], wherein the B-4 is a group consisting of bicyclopyrone, mesotrione, tembotrione, isoxaflutole, fenquinotrione, topramezone, tolpyralate, lancotrione-sodium salt, 2-methyl-N-(5-methyl-1,3,4-oxadiazol-2-yl)-3-(methylsulfonyl)-4-(trifluoromethyl)benzamide (CAS Registry Number 1400904-50-8), 2-chloro-N-(1-methyl-1H-tetrazol-5-yl)-3-(methylthio)-4-(trifluoromethyl)benzamide (CAS Registry Number 1361139-71-0), and 4-(4-fluorophenyl)-6-[(2-hydroxy-6-oxo-1-cyclohexene-1-yl)carbonyl]-2-methyl-1,2,4-triazine-3,5(2H,4H)-dione (CAS Registry Number 1353870-34-4)

(including agriculturally acceptable salts and derivatives thereof).

[8] The herbicidal composition according to [1], wherein the B-5 is a group consisting of norflurazon and fluridone (including agriculturally acceptable derivatives thereof).

[9] The herbicidal composition according to [1], wherein the B-6 is a group consisting of bentazone, bromoxynil octanoate, diuron, linuron, fluometuron, simazine, atrazine, ametryn, prometryn, and metribuzin (including agriculturally acceptable salts and derivatives thereof).

[10] The herbicidal composition according to [1], wherein the B-7 is a group consisting of alachlor, acetochlor, metolachlor, S-metolachlor, dimethenamid, dimethenamid-P, pyroxasulfone, and flufenacet (including agriculturally acceptable derivatives thereof).

[11] The herbicidal composition according to [1], wherein the B-8 is a group consisting of trifluralin, pendimethalin, and ethalfluralin (including agriculturally acceptable derivatives thereof).

[12] The herbicidal composition according to [1], wherein the B-9 is a group consisting of 2,4-DB, fluroxypyr, fluroxypyr-meptyl, clopyralid-olamine salt, clopyralid-potassium salt, clopyralid-triethylammonium salt, halauxifen, halauxifen-methyl, florpyrauxifen, and florpyrauxifen-benzyl (including an agriculturally acceptable salts and derivatives thereof).

[13] The herbicidal composition according to [1], wherein the B-10 is a group consisting of a combination of glyphosate, glyphosate-isopropylammonium salt, glyphosate-ammonium salt, glyphosate-dimethylamine salt, glyphosate-monoethanolamine salt, glyphosate-potassium salt, and glyphosate-guanidine salt (including agriculturally acceptable salts and derivatives thereof).

[14] The herbicidal composition according to [1], wherein the B-11 is a group consisting of glufosinate, glufosinate-ammonium salt, glufosinate-P, and glufosinate-P-sodium salt (including agriculturally acceptable salts and derivatives thereof).

[15] The herbicidal composition according to [1], wherein the B-12 is a group consisting of EPIC, diflufenzopyr, diflufenzopyr-sodium salt, clomazone, 2-[(2,4-dichlorophenyl)methyl]-4,4-dimethyl-isoxazolidin-3-one (CAS Registry Number: 81777-95-9) (3S,4S)—N-(2-fluorophenyl)-1-methyl-2-oxo-4-[3-(trifluoromethyl)phenyl]-3-pyrrolidinecarboxamide (CAS Registry Number: 2053901-33-8), cinmethylin, MSMA, paraquat, paraquat dichloride, diquat, and diquat dibromide (including agriculturally acceptable salts and derivatives thereof).

[16] The herbicidal composition according to [1], wherein the safener group C is a group consisting of benoxacor, cyprosulfamide, and isoxadifen-ethyl (including agriculturally acceptable salts and derivatives thereof).

[17] A herbicide including the herbicidal composition according to any one of [1] to [16].

[18] A method for controlling weeds, the method including a step of applying trifludimoxazin and at least one compound selected from the group consisting of the herbicide compound group B and the safener group C simultaneously or sequentially to a place where weeds are growing or to grow.

[19] The method according to [18], wherein trifludimoxazin and the at least one compound selected from the group consisting of the herbicide compound group B and the safener group C are used at a weight ratio of 1:0.1 to 1:50.

[20] The method according to [18] or [19], wherein the place where weeds are growing or to grow is a crop field.

[21] A use of the herbicidal composition according to any one of [1] to [16], for controlling weeds.

EFFECT OF THE INVENTION

According to the present invention, it is possible to control weeds with high efficacy.

MODE FOR CARRYING OUT THE INVENTION

The herbicidal composition according to the present invention (hereinafter referred to as 'present composition') includes trifludimoxazin and at least one compound selected from the group consisting of a herbicide compound group B and a safener group C.

At least three crystalline polymorphs having different crystal structures are known for trifludimoxazin (see WO 2013/174693 and WO 2013/174694), and examples of trifludimoxazin described in the present invention include all the crystalline polymorphs and mixtures of any two or more of the crystalline polymorphs.

The method for controlling weeds according to the present invention (hereinafter referred to as 'present method') includes the step of applying the present composition to a place where weeds are growing or to grow in a crop field, a vegetable field, a land under perennial crops, a non-crop land, or the like. In a crop field and a vegetable field, the present composition may be applied before, simultaneously with, and/or after sowing a crop seed.

The present method includes the step of applying trifludimoxazin and at least one compound selected from the group consisting of the herbicide compound group B and the safener group C simultaneously or sequentially to a place where weeds are growing or to grow. In the case of the sequential application, the order of the application is not particularly limited.

The present composition is usually a formulation prepared by mixing trifludimoxazin and the at least one compound selected from the group consisting of the herbicide compound group B and the safener group C with a carrier such as a solid carrier or a liquid carrier, and adding an auxiliary agent for formulation such as a surfactant if necessary. Preferable formulation types of such a formulation are aqueous liquid suspension concentrates, wettable powders, water dispersible granules, granules, and emulsifiable concentrates. The present composition may be used in combination with a formulation containing another herbicide as an active ingredient.

The total content of trifludimoxazin and the at least one compound selected from the group consisting of the herbicide compound group B and the safener group C in the present composition is usually within a range of 0.01 to 90% by weight, preferably 1 to 80% by weight.

Hereinafter, when the at least one compound selected from the group consisting of the herbicide compound group B is a salt (for example, glyphosate-potassium salt), the weight of the at least one compound is represented by the acid equivalent.

A mixing ratio of trifludimoxazin to the at least one compound selected from the group consisting of the herbicide compound group B and the safener group C in the present composition is within a range of 1:0.05 to 1:100, preferably 1:0.1 to 1:50 by weight ratio.

A ratio of application rates of trifludimoxazin to the at least one compound selected from the group consisting of the herbicide compound group B and the safener group C in the present method is within a range of 1:0.05 to 1:100, preferably 1:0.1 to 1:50 by weight ratio.

More preferable examples of the mixing ratio of trifludimoxazin to the at least one compound selected from the group consisting of the herbicide compound group B and the safener group C in the present composition include about 1:0.1, about 1:0.2, about 1:0.3, about 1:0.5, about 1:0.7, about 1:1, about 1:2, about 1:3, about 1:5, about 1:7, about 1:10, about 1:15, about 1:20, about 1:30, and about 1:50 by weight ratio.

More preferable examples of the ratio of application rates of trifludimoxazin to the at least one compound selected from the group consisting of the herbicide compound group B and the safener group C in the present method include about 1:0.1, about 1:0.2, about 1:0.3, about 1:0.5, about 1:0.6, about 1:0.7, about 1:0.8, about 1:1, about 1:1.2, about 1:1.4, about 1:1.6, about 1:1.8, about 1:2, about 1:2.2, about 1:2.4, about 1:2.6, about 1:2.8, about 1:3, about 1:5, about 1:7, about 1:10, about 1:15, about 1:20, about 1:30, and about 1:50 by weight ratio.

The word "about" in the preceding paragraph means that the specified ratio includes the ratio in the range increased or decreased by 10% by weight relative to the specified ratio. For example, a ratio of about 1:2 includes a range of 1:1.8 to 1:2.2.

In the present composition and the present method, particularly preferable examples of the combination of trifludimoxazin and the at least one compound selected from the group consisting of the herbicide compound group B and the safener group C and the range of weight ratio thereof include the combinations and the ranges described below, but are not limited thereto.

Combination of trifludimoxazin and pyrithiobac (1:0.1 to 1:20)

Combination of trifludimoxazin and pyrithiobac-sodium salt (1:0.1 to 1:20)

Combination of trifludimoxazin and chlorimuron-ethyl (1:0.1 to 1:20)

Combination of trifludimoxazin and foramsulfuron (1:0.1 to 1:20)

Combination of trifludimoxazin and halosulfuron-methyl (1:0.1 to 1:20)

Combination of trifludimoxazin and nicosulfuron (1:0.1 to 1:20)

Combination of trifludimoxazin and primisulfuron-methyl (1:0.1 to 1:20)

Combination of trifludimoxazin and rimsulfuron (1:0.1 to 1:20)

Combination of trifludimoxazin and trifloxysulfuron-sodium salt (1:0.1 to 1:20)

Combination of trifludimoxazin and chlorsulfuron (1:01 to 1:20)

Combination of trifludimoxazin and iodosulfuron-methyl-sodium (1:0.1 to 1:20)

Combination of trifludimoxazin and iofensulfuron-sodium (1:0.1 to 1:20)

Combination of trifludimoxazin and metsulfuron-methyl (1:0.1 to 1:20)

Combination of trifludimoxazin and prosulfuron (1:0.1 to 1:20)

Combination of trifludimoxazin and thifensulfuron-methyl (1:0.1 to 1:20)

Combination of trifludimoxazin and tribenuron-methyl (1:0.1 to 1:20)

Combination of trifludimoxazin and thiencarbazone-methyl (1:0.1 to 1:20)

Combination of trifludimoxazin and cloransulam-methyl (1:0.1 to 1:20)

Combination of trifludimoxazin and flumetsulam (1:0.1 to 1:20)

Combination of trifludimoxazin and imazamethabenz-methyl (1:0.1 to 1:20)

Combination of trifludimoxazin and imazamox-ammonium salt (1:0.1 to 1:20)

Combination of trifludimoxazin and imazapic-ammonium salt (1:0.1 to 1:20)

Combination of trifludimoxazin and imazapyr-isopropylammonium salt (1:0.1 to 1:20)

Combination of trifludimoxazin and imazaquin-ammonium salt (1:0.1 to 1:20)

Combination of trifludimoxazin and imazethapyr-ammonium salt (1:0.1 to 1:20)

Combination of trifludimoxazin and fenoxaprop-ethyl (1:0.1 to 1:20)

Combination of trifludimoxazin and fenoxaprop-P-ethyl (1:0.1 to 1:20)

Combination of trifludimoxazin and fluazifop-butyl (1:0.1 to 1:20)

Combination of trifludimoxazin and fluazifop-P-butyl (1:0.1 to 1:20)

Combination of trifludimoxazin and quizalofop-ethyl (1:0.1 to 1:20)

Combination of trifludimoxazin and quizalofop-P-ethyl (1:0.1 to 1:20)

Combination of trifludimoxazin and clethodim (1:0.1 to 1:20)

Combination of trifludimoxazin and sethoxydim (1:0.1 to 1:20)

Combination of trifludimoxazin and carfentrazone-ethyl (1:0.1 to 1:20)

Combination of trifludimoxazin and saflufenacil (1:0.1 to 1:20)

Combination of trifludimoxazin and sulfentrazone (1:0.1 to 1:30)

Combination of trifludimoxazin and pyraflufen-ethyl (1:0.1 to 1:30)

Combination of trifludimoxazin and fluthiacet-methyl (1:0.1 to 1:20)

Combination of trifludimoxazin and flufenpyr-ethyl (1:0.1 to 1:20)

Combination of trifludimoxazin and flumiclorac-pentyl (1:0.1 to 1:20)

Combination of trifludimoxazin and flumioxazin (1:0.1 to 1:20)

Combination of trifludimoxazin and oxyfluorfen (1:0.1 to 1:30)

Combination of trifludimoxazin and acifluorfen-sodium salt (1:0.1 to 1:30)

Combination of trifludimoxazin and fomesafen-sodium salt (1:0.1 to 1:30)

Combination of trifludimoxazin and lactofen (1:0.1 to 1:30)

Combination of trifludimoxazin and tiafenacil (1:0.1 to 1:20)

Combination of trifludimoxazin and ethyl [(3-{2-chloro-4-fluoro-5-[3-methyl-4-(trifluoromethyl)-2,6-dioxo-1,2,3,6-tetrahydropyrimidine-1-yl]phenoxy}pyridin-2-yl)oxy]acetate (1:0.1 to 1:20)

Combination of trifludimoxazin and bicyclopyrone (1:0.1 to 1:20)

Combination of trifludimoxazin and mesotrione (1:0.1 to 1:20)

Combination of trifludimoxazin and tembotrione (1:0.1 to 1:20)

Combination of trifludimoxazin and isoxaflutole (1:0.1 to 1:20)

Combination of trifludimoxazin and fenquinotrione (1:0.1 to 1:20)

Combination of trifludimoxazin and topramezone (1:0.1 to 1:20)

Combination of trifludimoxazin and tolpyralate (1:0.1 to 1:20)

Combination of trifludimoxazin and lancotrione-sodium salt (1:0.1 to 1:20)

Combination of trifludimoxazin and 2-methyl-N-(5-methyl-1,3,4-oxadiazol-2-yl)-3-(methylsulfonyl)-4-(trifluoromethyl)benzamide (CAS Registry Number: 1400904-50-8) (1:0.1 to 1:20)

Combination of trifludimoxazin and 2-chloro-N-(1-methyl-1H-tetrazol-5-yl)-3-(methylthio)-4-(trifluoromethyl)benzamide (CAS Registry Number: 1361139-71-0) (1:0.1 to 1:20)

Combination of trifludimoxazin and 4-(4-fluorophenyl)-6-[(2-hydroxy-6-oxo-1-cyclohexene-1-yl)carbonyl]-2-methyl-1,2,4-triazine-3,5(2H,4H)-dione (CAS Registry Number: 1353870-34-4) (1:0.1 to 1:20)

Combination of trifludimoxazin and norflurazon (1:0.1 to 1:20)

Combination of trifludimoxazin and fluridone (1:0.1 to 1:20)

Combination of trifludimoxazin and bentazone (1:1 to 1:50)

Combination of trifludimoxazin and bromoxynil octanoate (1:1 to 1:50)

Combination of trifludimoxazin and diuron (1:1 to 1:50)

Combination of trifludimoxazin and linuron (1:1 to 1:50)

Combination of trifludimoxazin and fluometuron (1:1 to 1:50)

Combination of trifludimoxazin and simazine (1:1 to 1:50)

Combination of trifludimoxazin and atrazine (1:1 to 1:50)

Combination of trifludimoxazin and ametryn (1:1 to 1:50)

Combination of trifludimoxazin and prometryn (1:1 to 1:50)

Combination of trifludimoxazin and metribuzin (1:1 to 1:50)

Combination of trifludimoxazin and alachlor (1:1 to 1:50)

Combination of trifludimoxazin and acetochlor (1:1 to 1:50)

Combination of trifludimoxazin and metolachlor (1:1 to 1:50)

Combination of trifludimoxazin and S-metolachlor (1:1 to 1:50)

Combination of trifludimoxazin and dimethenamid (1:1 to 1:50)

Combination of trifludimoxazin and dimethenamid-P (1:1 to 1:50)

Combination of trifludimoxazin and pyroxasulfone (1:0.1 to 1:20)

Combination of trifludimoxazin and flufenacet (1:0.1 to 1:20)

Combination of trifludimoxazin and trifluralin (1:1 to 1:50)

Combination of trifludimoxazin and pendimethalin (1:1 to 1:50)

Combination of trifludimoxazin and ethalfluralin (1:1 to 1:50)

Combination of trifludimoxazin and 2,4-DB (1:1 to 1:50)

Combination of trifludimoxazin and fluroxypyr (1:1 to 1:50)

Combination of trifludimoxazin and fluroxypyr-meptyl (1:1 to 1:50)

Combination of trifludimoxazin and clopyralid-olamine salt (1:1 to 1:50)

Combination of trifludimoxazin and clopyralid-potassium salt (1:1 to 1:50)

Combination of trifludimoxazin and clopyralid-triethylammonium salt (1:1 to 1:50)

Combination of trifludimoxazin and halauxifen (1:0.1 to 1:20)

Combination of trifludimoxazin and halauxifen-methyl (1:0.1 to 1:20)

Combination of trifludimoxazin and florpyrauxifen (1:0.1 to 1:20)

Combination of trifludimoxazin and florpyrauxifen-benzyl (1:0.1 to 1:20)

Combination of trifludimoxazin and glyphosate (1:1 to 1:50)

Combination of trifludimoxazin and glyphosate-isopropylammonium salt (1:1 to 1:50)

Combination of trifludimoxazin and glyphosate-ammonium salt (1:1 to 1:50)

Combination of trifludimoxazin and glyphosate-dimethylamine salt (1:1 to 1:50)

Combination of trifludimoxazin and glyphosate-monoethanolamine salt (1:1 to 1:50)

Combination of trifludimoxazin and glyphosate-potassium salt (1:1 to 1:50)

Combination of trifludimoxazin and glyphosate-guanidine salt (1:1 to 1:50)

Combination of trifludimoxazin and glufosinate (1:1 to 1:50)

Combination of trifludimoxazin and glufosinate-ammonium salt (1:1 to 1:50)

Combination of trifludimoxazin and glufosinate-P (1:1 to 1:50)

Combination of trifludimoxazin and glufosinate-P-sodium salt (1:1 to 1:50)

Combination of trifludimoxazin and EPIC (1:1 to 1:50)

Combination of trifludimoxazin and diflufenzopyr (1:1 to 1:50)

Combination of trifludimoxazin and diflufenzopyr-sodium salt (1:1 to 1:50)

Combination of trifludimoxazin and clomazone (1:1 to 1:50)

Combination of trifludimoxazin and 2-[(2,4-dichlorophenyl)methyl]-4,4-dimethylisoxazolidin-3-one (CAS Registry Number: 81777-95-9) (1:1 to 1:50)

Combination of trifludimoxazin and (3S,4S)—N-(2-fluorophenyl)-1-methyl-2-oxo-4-[3-(trifluoromethyl)phenyl]-3-pyrrolidinecarboxamide (CAS Registry Number: 2053901-33-8) (1:1 to 1:50)

Combination of trifludimoxazin and cinmethylin (1:1 to 1:50)

Combination of trifludimoxazin and MSMA (1:1 to 1:50)

Combination of trifludimoxazin and paraquat (1:1 to 1:50)

Combination of trifludimoxazin and paraquat-dichloride (1:1 to 1:50)

Combination of trifludimoxazin and diquat (1:1 to 1:50)

Combination of trifludimoxazin and diquat-dibromide (1:1 to 1:50)

Combination of trifludimoxazin and benoxacor (1:0.1 to 1:20)

Combination of trifludimoxazin and cyprosulfamide (1:0.1 to 1:20)

Combination of trifludimoxazin and isoxadifen-ethyl (1:0.1 to 1:20)

The present composition exhibits a synergistic herbicidal effect on a wide range of weeds compared to the effect that can be expected from the herbicidal effects obtained when each one of trifludimoxazin and the at least one compound selected from the group consisting of the herbicide compound group B and the safener group C is used alone, so that the wide range of weeds can be effectively controlled in a crop field, a vegetable field each where a normal tillage cultivation or no-tillage cultivation is performed, a land under perennial crops, or a non-crop land.

The present method exhibits a synergistic herbicidal effect on a wide range of weeds compared to the effect that can be expected from the herbicidal effects obtained when each one of trifludimoxazin and the at least one compound selected from the group consisting of the herbicide compound group B and the safener group C is used alone, so that the wide range of weeds can be effectively controlled in a crop field, a vegetable field each where a normal tillage cultivation or no-tillage cultivation is performed, a land under perennial crops, or a non-crop land.

Before, simultaneously with, and/or after sowing a crop seed treated with one or more compounds selected from the group consisting of an insecticide compound, a nematicide compound, a fungicide compound, and the like, the present composition may be applied to the field in which the crop seed have been sown or is to be sown.

The present composition may be used in combination with another pesticidally active compound. Examples of the insecticide compound, the nematicide compound, and the fungicide compound which may be used in combination with the present composition include neonicotinoid compounds, diamide compounds, carbamate compounds, organophosphorus compounds, biological nematicide compounds, other insecticide compounds and nematicide compounds, azole compounds, strobilurin compounds, metalaxyl compounds, SDHI compounds, and other fungicide compounds and plant growth regulators.

Examples of the crop field in the present invention include edible crop fields such as peanut fields, soybean fields, corn fields, and wheat fields, feed crop fields such as sorghum fields and oat fields, industrial crop fields such as cotton fields and rape fields, and sugar crop fields such as sugarcane fields and sugar beet fields. Examples of the vegetable field in the present invention include fields for cultivation of solanaceous vegetables (eggplants, tomatoes, bell peppers, capsicums, potatoes, and the like), fields for cultivation of cucurbitaceous vegetables (cucumbers, pumpkins, zucchini, watermelons, melons, and the like), fields for cultivation of cruciferous vegetables (radishes, turnips, horseradishes, kohlrabies, Chinese cabbages, cabbages, mustard, broccolis, cauliflowers, and the like), fields for cultivation of asteraceous vegetables (burdocks, garland chrysanthemums, artichokes, lettuces, and the like), fields for cultivation of liliaceous vegetables (leeks, onions, garlics, and asparagus), fields for cultivation of apiaceous vegetables (carrots, parsley, celery, parsnips, and the like), fields for cultivation of chenopodiaceous vegetables (spinach, chards, and the like), fields for cultivation of lamiaceous vegetables (perilla, mint, basil, and lavender), strawberry fields, sweet potato fields, yam fields, and taro fields.

Examples of the land under perennial crops in the present invention include orchards, tea fields, mulberry fields, coffee fields, banana fields, palm fields, flowering tree firms, flowering tree fields, planting stock fields, nursery fields, forest lands, and gardens. Examples of the orchard trees in the present invention include pomaceous fruits (apples, pears, Japanese pears, Chinese quinces, quinces, and the like), stone fruits (peaches, plums, nectarines, Japanese apricots, cherries, apricots, prunes, and the like), citrus fruits (Citrus unshiu, oranges, lemons, limes, grapefruits, and the like), nut trees (chestnuts, walnuts, hazelnut trees, almonds, pistachios, cashew nut trees, macadamia nut trees, and the like), berry fruits (grapes, blueberries, cranberries, blackberries, raspberries, and the like), Japanese persimmons, olives, and loquats.

Examples of the non-crop land in the present invention include athletic fields, empty lots, railroad edges, parks, parking lots, road edges, dry riverbeds, lands under a power line, residential lands, and factory sites.

The crop cultivated in the crop field in the present invention is not limited as long as the crop is a variety generally cultivated as a crop.

The plant of the above-mentioned variety may be a plant that can be produced by natural crossing, a plant that can be generated by mutation, an F1 hybrid plant, or a transgenic plant (also referred to as a genetically-modified plant). The plant generally has properties such as obtaining of the tolerance to a herbicide, accumulation of a toxic substance against a pest, suppression of the susceptibility to a disease, increase in the yield potential, improvement in the tolerance to a biotic and an abiotic stressors, accumulation of a substance, and improvement in the preservability and the processability.

An F1 hybrid plant is a first-generation hybrid obtained by crossing varieties of two different strains, and generally has a heterotic property with a trait superior than that of either of the parents. A transgenic plant has a foreign gene introduced from another organism or the like such as a microorganism and has a property that cannot be easily obtained by cross breeding, mutagenesis, or natural recombination in a natural environment.

Examples of the techniques for producing the above-mentioned plants include conventional breeding techniques; genetic engineering techniques; genome breeding techniques; new breeding techniques; and genome editing techniques. Conventional breeding techniques are for obtaining a plant having a desirable property by mutation or crossing. Genetic engineering techniques are a technique for imparting a new property to a target organism by extracting a target gene (DNA) from another organism (for example, a microorganism) and introducing the target gene into the genome of the target organism, and are an antisense technique or an RNA interference technique for imparting a new or improved property by silencing another gene present in the plant. Genome breeding techniques are for improving breeding efficiency using genomic information, and examples of the genome breeding techniques include DNA marker (also called genomic marker or genetic marker) breeding techniques and genomic selection. For example, DNA marker breeding is a method in which a progeny having a target useful trait gene is selected from a large number of crossed progenies using a DNA marker that is a DNA sequence that serves as a marker of the location of the specific useful trait gene on the genome. In the method, the crossed progeny is analyzed when it is an infant plant using a DNA marker to effectively shorten the time required for the breeding.

Genomic selection is a technique in which a prediction formula is created from a phenotype and genomic information obtained in advance to predict the property from the prediction formula and the genomic information without evaluating the phenotype, and is a technique that can contribute to improving breeding efficiency. The term "new breeding techniques" is a general term for breed improvement (breeding) techniques that combine molecular biological techniques. Examples of the new breeding techniques include cisgenesis/intragenesis, oligonucleotide-directed mutagenesis, RNA-dependent DNA methylation, genome editing, grafting on a GM rootstock or a scion, reverse breeding, agroinfiltration, and seed production technology (SPT). The genome editing technique is for converting genetic information in a sequence-specific manner, and it is possible to delete a base sequence, substitute an amino acid sequence, introduce a foreign gene, and the like using the technique. Examples of the tool include sequence-specific genome modification techniques such as a zinc finger nuclease capable of sequence-specific DNA cleavage (Zinc-Finger, ZFN), TALEN, CRISPR-Cas9, CRISPER-Cpf1, Meganuclease, and CAS9 Nickase and Target-AID created by modifying the aforementioned tools.

Examples of the above-mentioned plants include plants listed in the database of the registered genetically-modified crops (GM Approval Database) in the electronic information site of International Service for the Acquisition of Agri-biotech Applications (ISAAA) (http://www.isaaa.org/). More specific examples are herbicide-tolerant plants, pest-resistant plants, disease-resistant plants, plants modified in the quality (for example, with increase or decrease in the content or change in the composition) of the products (for example, starch, amino acids, and fatty acids), fertility trait-modified plants, abiotic stress-tolerant plants, and plants modified in the trait related to the growth or the yield.

Examples of the plants to which herbicide tolerance has been imparted are described below.

The mechanism of obtaining tolerance to a herbicide is reduction in the affinity between the agent and its target, rapid metabolism (decomposition, modification, and the like) of the agent by an expressed enzyme that inactivates the agent, or inhibition of incorporation or translocation of the agent in the plant body.

Examples of the plants to which herbicide tolerance has been imparted by genetic engineering technique include plants to which tolerance has been imparted to 4-hnydroxyphenylpyruvate dioxygenase (hereinafter abbreviated as HPPD) inhibitors such as isoxaflutole and mesotrione, acetolactate synthase (hereinafter abbreviated as ALS) inhibitors such as imidazolinone herbicides containing imazethapyr and sulfonylurea herbicides containing thifensulfuron-methyl, 5-enolpyruvylshikimate-3-phosphate synthase (hereinafter abbreviated as EPSP) inhibitors such as glyphosate, glutamine synthase inhibitors such as glufosinate, auxin herbicides such as 2,4-D and dicamba, and oxynyl herbicides containing bromoxynil. Preferable herbicide-tolerant transgenic plants are cereals such as wheat, barley, rye, and oats, canola, sorghum, soybeans, rice, rape, sugar beet, sugar cane, grapes, lentils, sunflowers, alfalfa, pomaceous fruits, drupes, coffee, tea, strawberries, lawn grass, tomatoes, potatoes, cucumbers, and vegetables such as lettuces, and more preferable herbicide-tolerant transgenic plants are cereals such as wheat, barley, rye, and oats, soybeans, rice, vines, tomatoes, potatoes, and pomaceous fruits.

The specific herbicide-tolerant plants are shown below.

Glyphosate herbicide-tolerant plants; in order to obtain the glyphosate herbicide-tolerant plants, one or more genes are introduced among a glyphosate-tolerant EPSPS gene (CP4 epsps) from *Agrobacterium tumefaciens* strain CP4, a glyphosate metabolizing enzyme gene (gat4601, gat4621) in which the metabolic activity of the glyphosate metabolizing enzyme (glyphosate N-acetyltransferase) gene from *Bacillus licheniformis* is enhanced by a shuffling technique, a glyphosate metabolizing enzyme (glyphosate oxidase gene, goxv247) from Ochrobacterum anthropi strain LBAA, and EPSPS genes that are from maize and have glyphosate-tolerant mutation (mepsps, 2mepsps). Main examples of the plants are alfalfa (*Medicago sativa*), *Argentine canola* (*Brassica napus*), cotton (*Gossypium hirsutum* L.), creeping bentgrass (*Agrostis stolonifera*), maize (*Zea mays* L.), polish canola (*Brassica rapa*), a potato (*Solanum tubeHDDrosum* L.), a soybean (*Glycine max* L.), sugar beet (*Beta vulgaris*), and wheat (*Triticum aestivum*). Some glyphosate-tolerant transgenic plants are commercially available. For example, the genetically-modified plant in which the glyphosate-tolerant EPSPS from the *Agrobacterium* is expressed is commercially available with a trade name such as "Roundup Ready (registered trademark)", the genetically-modified plant in which the glyphosate metabolizing enzyme that is from the *Bacillus* and has the metabolic activity enhanced by a shuffling technique is expressed is commercially available with a trade name such as "Optimum (registered trademark) GAT (trademark)" or "Optimum (registered trademark) Gly canola", and the genetically-modified plant in which the EPSPS that is from maize and has glyphosate-tolerant mutation is expressed is commercially available with the trade name "GlyTol (trademark)".

Glufosinate herbicide-tolerant plants; in order to obtain the glufosinate herbicide-tolerant plants, one or more genes are introduced among a phosphinothricin N-acetyltransferase (PAT) gene (bar) that is a glufosinate metabolizing enzyme from *Streptomyces hygroscopicus*, a phosphinothricin N-acetyltransferase (PAT) enzyme gene (pat) that is a glufosinate metabolizing enzyme from *Streptomyes viridochromogenes*, and a synthesized pat gene (pat syn) from *Streptomyes viridochromogenes* strain Tu494. Main examples of the plants are *Argentine canola* (*Brassica napus*), chicory (*Cichorium intybus*), cotton (*Gossypium hirsutum* L.), maize (*Zea mays* L.), polish canola (*Brassica rapa*), rice (*Oryza sativa* L.), a soybean (*Glycine max* L.), and sugar beet (*Beta vulgaris*). Some glufosinate-tolerant genetically-modified plants are commercially available. The genetically-modified plant from a glufosinate metabolizing enzyme (bar) from *Streptomyces hygroscopicus*, and from *Streptomyes viridochromogenes* is commercially available with a trade name such as "LibertyLink (trademark)", "InVigor (trademark)", or "WideStrike (trademark)". Oxynil herbicide (for example, bromoxynil)-tolerant plants; there are oxynil herbicide-tolerant, for example, bromoxynil-tolerant transgenic plants into which a nitrilase gene (bxn) is introduced that is an oxynil herbicide metabolizing enzyme from *Klebsiella pneumoniae* subsp. ozaenae. Main examples of the plants are *Argentine canola* (*Brassica napus*), cotton (*Gossypium hirsutum* L.), and tobacco (*Nicotiana tabacum* L.). The plants are commercially available with a trade name such as "Navigator (trademark) canola" or "BXN (trademark)". ALS herbicide-tolerant plants; carnations (*Dianthus caryophyllus*) into which an ALS herbicide-tolerant ALS gene (surB) as a selection marker from tobacco (*Nicotiana tabacum*) is introduced are commercially available with the trade names "Moondust (trademark)", "Moonshadow (trademark)", "Moonshade (trademark)", "Moonlite (trademark)", "Moonaqua (trademark)", "Moonvista (trademark)", "Moonique (trademark)", "Moonpearl (trademark)", "Moonberry (trademark)", and "Moonvelvet (trademark)"; flax (*Linum usitatissumum* L.) into which an ALS herbicide-tolerant ALS gene (als) from *Arabidopsis thaliana* is introduced is commercially available with the trade name "CDC Triffid Flax"; sulfonylurea herbicide-tolerant and an imidazolinone herbicide-tolerant maize (*Zea mays* L.) into which an ALS herbicide-tolerant ALS gene (zm-hra) from maize is introduced is commercially available with the trade name "Optimum (trademark) GAT (trademark)"; an imidazolinone herbicide-tolerant soybean into which an ALS herbicide-tolerant ALS gene (csr1-2) from *Arabidopsis thaliana* is introduced is commercially available with the trade name "Cultivance"; sulfonylurea herbicide-tolerant soybeans into which an ALS herbicide-tolerant ALS gene (gm-hra) from a soybean (*Glycine max*) is introduced are commercially available with the trade names "Treus (trademark)", "Plenish (trademark)", and "Optimum GAT (trademark)". There is also cotton into which an ALS herbicide-tolerant ALS gene (S4-HrA) from tobacco (*Nicotiana tabacum* cv. *Xanthi*) is introduced. HPPD herbicide-tolerant plants; a soybean into which a mesotrione-tolerant HPPD gene (avhppd-03) from an oat (*Avena sativa*) and a phinothricin N-acetyltransferase (PAT) enzyme gene (pat) are simultaneously introduced, the soybean tolerant to homesotrione that is a glufosinate metabolizing enzyme from *Streptomyes viridochromogenes* is commercially available with the trade name "Herbicide-tolerant Soybean line".

2,4-D-tolerant plants; maize into which an aryloxyalkanoate dioxygenase gene (aad-1) that is a 2,4-D metabolizing enzyme from *Sphingobium herbicidovorans* is introduced is commercially available with the trade name "Enlist (trademark) Maize". A soybean and cotton into which an aryloxyalkanoate dioxygenase gene (aad-12) that is a 2,4-D metabolizing enzyme from Delftia acidovorans is introduced is commercially available with the trade name "Enlist (trademark) Soybean".

Dicamba-tolerant plants; there are a soybean and cotton into which a dicamba monooxygenase gene (dmo) that is a dicamba metabolizing enzyme from *Stenotrophomonas maltophilia* strain DI-6 is introduced. A soybean (*Glycine max* L.) into which a glyphosate-tolerant EPSPS gene (CP4 epsps) from *Agrobacterium tumefaciens* strain CP4 is introduced simultaneously with the above-mentioned gene is commercially available with the trade name "Genuity (registered trademark) Roundup Ready (trademark) 2 Xtend (trademark)".

Examples of the commercially available transgenic plants to which herbicide tolerance has been imparted include the glyphosate-tolerant maize "Roundup Ready Corn", "Roundup Ready 2", "Agrisure GT", "Agrisure GT/CB/LL", "Agrisure GT/RW", "Agrisure 3000GT", "YieldGard VT Rootworm/RR2", and "YieldGard VT Triple"; the glyphosate-tolerant soybeans "Roundup Ready Soybean" and "Optimum GAT"; the glyphosate-tolerant cotton "Roundup Ready Cootton" and "Roundup Ready Flex"; the glyphosate-tolerant canola "Roundup Ready Canola"; the glyphosate-tolerant alfalfa "Roundup Ready Alfalfa", the glyphosate-tolerant rice "Roundup Ready Rice"; the glufosinate-tolerant maize "Roundup Ready 2", "Liberty Link", "Herculex 1", "Herculex RW", "Herculex Xtra", "Agrisure GT/CB/LL", "Agrisure CB/LL/RW", and "Bt10"; the glufosinate-tolerant cotton "FiberMax Liberty Link"; the glufosinate-tolerant rice "Liberty Link Rice"; the glufosinate-tolerant canola "in Vigor"; the glufosinate-tolerant rice "Liberty Link Rice" (manufactured by Bayer AG); the bromoxynil-tolerant cotton "BXN"; the bromoxynil-tolerant canola "Navigator" and "Compass"; and the glufosinate-tolerant canola "InVigor". Additional plants modified with respect to a herbicide are widely known, and the examples of the plants include alfalfa, apples, barley, eucalyptuses, flax, grapes, lentils, rape, peas, potatoes, rice, sugar beet, sunflowers, tobacco, tomatom, turfgrass, and wheat that are tolerant to glyphosate (see, for example, U.S. Pat. Nos. 5,188,642, 4,940,835, 5,633,435, 5,804,425, and 5,627, 061); beans, cotton, soybeans, peas, potatoes, sunflowers, tomatoes, tobacco, maize, sorghum, and sugar cane that are tolerant to dicamba (see, for example, WO2008051633, U.S. Pat. Nos. 7,105,724, and 5,670,454); soybeans, sugar beet, potatoes, tomatoes, and tobacco that are tolerant to glufosinate (see, for example, U.S. Pat. Nos. 6,376,754, 5,646,024, and 5,561,236); cotton, peppers, apples, tomatoes, sunflowers, tobacco, potatoes, maize, cucumbers, wheat, soybeans, sorghum, and cereals that are tolerant to 2,4-D (see, for example, U.S. Pat. Nos. 6,153,401, 6,100,446, WO2005107437, U.S. Pat. Nos. 5,608,147, and 5,670,454); and canola, maize, millet, barley, cotton, mustard, lettuces, lentils, melons, millet, oats, sword beans, potatoes, rice, rye, sorghum, soybeans, sugar beet, sunflowers, tobacco, tomatoes, and wheat that are tolerant to acetolactate synthase (ALS) inhibitor herbicide (for example, a sulfonylurea herbicide and an imidazolinone herbicide) (see, for example, U.S. Pat. No. 5,013,659, WO2006060634, U.S. Pat. Nos. 4,761,373, 5,304,732, 6,211,438, 6,211,439, and 6,222,100). The rice tolerant to an imidazolinone herbicide is especially known, and examples of the rice include rice having specific mutation (for example, S653N, S654K, A122T, S653(At)N, 5654(At)K, and A122 (At) T) in the acetolactate synthase gene (acetohydroxyacid synthase gene) (see, for example, US 2003/0217381, and WO200520673); and the examples include barley, sugar cane, rice, maize, tobacco, soybeans, cotton, rape, sugar beet, wheat, and potatoes that are tolerant to an HPPD inhibitor herbicide (for example, an isoxazole herbicide such as isoxaflutole, a triketone herbicide such as sulcotrione or mesotrione, a pyrazole herbicide such as pyrazolynate, or diketonitrile that is a decomposition product of isoxaflutole) (see, for example, WO2004/055191, WO199638567, WO1997049816, and U.S. Pat. No. 6,791, 014).

Examples of the plants to which herbicide tolerance has been imparted by a classical technique or a genome breeding technique include the rice "Clearfield Rice", the wheat "Clearfield Wheat", the sunflower "Clearfield Sunflower", the lentil "Clearfield lentils", and the canola "Clearfield canola" (manufactured by BASF SE) that are tolerant to an imidazolinone-based ALS inhibitor herbicide such as imazethapyr or imazamox; the soybean "STS soybean" that is tolerant to a sulfonyl-based ALS inhibitor herbicide such as thifensulfuron-methyl; the sethoxydim-tolerant maize "SR corn" and "Poast Protected (registered trademark) corn" that are tolerant to an acetyl-CoA carboxylase inhibitor such as a trionoxime herbicide or an aryloxy phenoxypropionic acid herbicide; the sunflower "ExpressSun (registered trademark)" that is tolerant to a sulfonylurea herbicide such as tribenuron; the rice "Provisia (trademark) Rice" that is tolerant to an acetyl-CoA carboxylase inhibitor such as quizalofop; and the canola "Triazine Tolerant Canola" that is tolerant to a PSII inhibitor.

Examples of the plants to which herbicide tolerance has been imparted by a genome editing technique include the canola "SU Canola (registered trademark)" tolerant to a sulfonylurea herbicide in which a rapid variety development technique (Rapid Trait Development System, RIDS (registered trademark)) is used. RIDS (registered trademark) corresponds to oligonucleotide-directed mutagenesis of the genome editing technique, and by RIDS, it is possible to introduce mutation in a DNA in a plant via Gene Repair Oligonucleotide (GRON), that is, a chimeric oligonucleotide of the DNA and the RNA without cutting the DNA. In addition, examples of the plants include maize in which herbicide tolerance and phytic acid content have been reduced by deleting the endogenous gene IPK1 using zinc finger nuclease (see, for example, Nature 459, 437-441 2009); and rice to which herbicide tolerance has been imparted using CRISPR-Cas9 (see, for example, Rice, 7, 5 2014).

In the present invention, examples of the crop tolerant to a specific PPO inhibitor include crops to which PPO having a reduced affinity for the inhibitor is imparted by a genetic engineering technique. Alternatively, the crop may have a substance that detoxifies and decomposes the PPO inhibitor by cytochrome P450 monooxygenase alone or in combination with the above-mentioned PPO. The tolerant crops are described in, for example, patent documents such as WO2011085221, WO2012080975, WO2014030090, WO2015022640, WO2015022636, WO2015022639, WO2015092706, WO2016203377, WO2017198859, WO2018019860, WO2018022777, WO2017112589, WO2017087672, WO2017039969, and WO2017023778, and non patent document (Pest Management Science, 61, 2005, 277-285).

Examples of the plants to which herbicide tolerance has been imparted by a new breeding technique in which the property of a GM rootstock is imparted to a scion by a breeding technique in which grafting is used include the non-transgenic soybean scion to which glyphosate tolerance is imparted using the glyphosate-tolerant soybean Roundup Ready (registered trademark) as a rootstock (see Weed Technology 27: 412-416 2013).

The above-mentioned plants include strains to which two or more traits are imparted among abiotic stress tolerance, disease resistance, herbicide tolerance, pest resistance, a growth trait, a yield trait, nutrient uptake, product quality, a fertility trait, and the like as described above using a genetic engineering technique, a classical breeding technique, a genome breeding technique, a new breeding technique, a genome editing technique, or the like, and strains to which two or more of the properties of the parent strains are imparted by crossing plants having the same or different properties.

Examples of the commercially available plants to which tolerance to two or more herbicides are imparted include the cotton "GlyTol (trademark) LibertyLink (trademark)" and "GlyTol (trademark) LibertyLink (trademark)" that are tolerant to glyphosate and glufosinate; the maize "Roundup Ready (trademark) LibertyLink (trademark) Maize" that is tolerant to glyphosate and glufosinate; the soybean "Enlist (trademark) Soybean" that is tolerant to glufosinate and 2,4-D; the soybean "Genuity (registered trademark) Roundup Ready (trademark) 2 Xtend (trademark)" that is tolerant to glyphosate and dicamba; the maize and the soybean "OptimumGAT (trademark)" that are tolerant to glyphosate and an ALS inhibitor; the genetically modified soybeans "Enlist E3 (trademark)" and "Enlist (trademark) Roundup Ready 2 Yield (registered trademark)" that are tolerant to three herbicides of glyphosate, glufosinate, and 2,4-D; the genetically modified maize "Enlist (trademark) Roundup Ready (registered trademark) Corn 2" that is tolerant to glyphosate, 2,4-D, and an aryloxyphenoxypropionate (FOPs) herbicide; the genetically modified maize "Enlist (trademark) Roundup Ready (registered trademark) Corn 2" that is tolerant to glyphosate, 2,4-D, and an aryloxyphenoxypropionate (FOPs) herbicide; the genetically modified cotton "Bollgard II (registered trademark) XtendFlex (trademark) Cotton" that is tolerant to dicamba, glyphosate, and glufosinate; and the genetically modified cotton "Enlist (trademark) Cotton" that is tolerant to three herbicides of glyphosate, glufosinate, and 2,4-D. In addition, the cotton tolerant to glufosinate and 2,4-D, the cotton tolerant to both glufosinate and dicamba, the maize tolerant to both glyphosate and 2,4-D, the soybean tolerant to both glyphosate and an HPPD herbicide, and the genetically modified maize tolerant to glyphosate, glufosinate, 2,4-D, an aryloxyphenoxypropionate (FOPs) herbicide, and a cyclohexanedione (DIMs) herbicide have been also developed.

Examples of the commercially available plants to which herbicide tolerance and pest resistance are imparted include the maize "YieldGard Roundup Ready" and "YieldGard Roundup Ready 2" that are tolerant to glyphosate and resistant to a corn borer; the maize "Agrisure CB/LL" that is tolerant to glufosinate and resistant to a corn borer; the maize "Yield Gard VT Root worm/RR2" that is tolerant to glyphosate and resistant to a corn rootworm; the maize "Yield Gard VT Triple" that is tolerant to glyphosate and resistant to a corn rootworm and a corn borer; the maize "Herculex I" that is tolerant to glufosinate and resistant to a lepidopteran maize pest (Cry1F) (for example, resistance to a western bean cutworm, a corn borer, a black cutworm, and a fall armyworm); the maize "YieldGard Corn Rootworm/Roundup Ready 2" that is tolerant to glyphosate and resistant to a corn rootworm; the maize "Agrisure GT/RW" that is tolerant to glufosinate and resistant to a Coleoptera maize pest (Cry3A) (for example, resistant to a western corn rootworm, a northern corn rootworm, and a Mexican corn rootworm); the maize "Herculex RW" that is tolerant to glufosinate and resistant to a Coleoptera maize pest (Cry34/35Ab1) (for example, resistant to a western corn rootworm, a northern corn rootworm, and a Mexican corn rootworm); the maize "Yield Gard VT Root worm/RR2" that is tolerant to glyphosate and resistant to a corn rootworm; and the cotton "Bollgard 3 (registered trademark) XtendFlex (registered trademark)" that is tolerant to dicamba, glyphosate, and glufosinate and resistant to a lepidopteran cotton pest (for example, resistant to bollworms, a tobacco budworm, and armyworms).

In the present method, the present composition is applied to a place where weeds are growing or to grow. Examples of the method of applying the present composition include a method of spraying the present composition on soil and a method of spraying the present composition on weeds.

The application rate of the present composition is generally 1 to 10,000 g per 10,000 $m^2$, preferably 2 to 5,000 g per 10,000 $m^2$, and more preferably 5 to 2,000 g per 10,000 $m^2$ in terms of the total amount of trifludimoxazin and the at least one compound selected from the group consisting of the herbicide compound group B and the safener group C.

In the present method, an adjuvant may be mixed in the present composition, followed by applying.

The type of the adjuvant is not particularly limited, and examples of the adjuvant include oil-based adjuvants such as Agri-Dex and MSO, nonions (esters or ethers of polyoxyethylene) such as Induce, anions (substituted sulfonates) such as Gramine S, cations (polyoxyethylene amines) such as Genamin T 200BM, and organic silicons such as Silwett L77.

The pH and the hardness of the spray liquid prepared when the present composition is applied are not particularly limited, and the pH is usually in the range of 5 to 9, and the hardness is usually in the range of 0 to 500.

The time period for applying the present composition is not particularly limited, and is usually in the range of 5:00 am to 9:00 pm, and the photon flux density is usually 10 to 2,500 $\mu mol/m^2/s$.

When the present composition is applied to a crop field, the present composition may be applied before sowing a crop seed, simultaneously with sowing a crop seed, and/or after sowing a crop seed. That is, the frequency of the application of the present composition is once before, simultaneously with, or after sowing a crop seed, twice excluding before the sowing, excluding simultaneously with the sowing, or excluding after the sowing, or three times at all the timing.

When the present composition is applied before sowing a crop seed, the present composition is applied from 50 days before to immediately before the sowing, preferably from 30 days before to immediately before the sowing, more preferably from 20 days before to immediately before the sowing, and still more preferably from 10 days before to immediately before the sowing.

When the present composition is applied after sowing a crop seed, the present composition is usually applied from immediately after the sowing to before flowering. The composition is more preferably applied from immediately after the sowing to before the emergence, or from 1 to 6 leaf stages of the crop.

The case where the present composition is applied simultaneously with sowing a crop seed is the case where a sowing machine and a sprayer are integrated with each other.

Trifludimoxazin is a known compound and can be produced by the method described in WO 2010/145992.

In the step of applying the present composition in a cultivation area, trifludimoxazin and the at least one compound selected from the group consisting of the herbicide compound group B and the safener group C are usually mixed with a carrier such as a solid carrier or a liquid carrier, and an auxiliary agent for formulation such as a surfactant is added if necessary to prepare a formulation. Preferable formulation types is aqueous liquid suspension formulations, oil-based suspension formulations, wettable powders, water dispersible granules, granules, water-based emulsions, oil-based emulsions, and emulsifiable concentrates, and more preferable formulation type is emulsifiable concentrates. Furthermore, a formulation containing trifludimoxazin alone as an active ingredient and a formulation containing the at least one compound selected from the group consisting of the herbicide compound group B and the safener group C as an active ingredient may be used in combination. Furthermore, a formulation containing the present composition as active ingredients and a formulation containing another herbicide as an active ingredient may be used in combination.

Examples of the method of applying the present composition in a cultivation area include a method of spraying the present composition on the soil in the cultivation area and a method of spraying the present composition on a weeds that are growing. The composition is usually diluted with water, followed by spraying. The spray volume is not particularly limited, and is usually 50 to 1,000 L/ha, preferably 100 to 500 L/ha, and more preferably 140 to 300 L/ha.

Specific examples of the weed species to be controlled by the present composition include the weed species described below, but are not limited thereto.

Urticaceae weeds: Urtica urens

Polygonaceae weeds: *Polygonum convolvulus, Polygonum lapathifolium, Polygonum pensylvanicum, Polygonum persicaria, Polygonum longisetum,*

*Polygonum aviculare, Polygonum arenastrum, Polygonum cuspidatum, Rumex japonicus, Rumex crispus, Rumex obtusifolius, Rumex acetosa*

Portulacaceae weeds: *Portulaca oleracea*

Caryophyllaceae weeds: *Stellaria media, Stellaria aquatica, Cerastium holosteoides, Cerastium glomeratum, Spergula arvensis, Silene gallica*

Molluginaceae weeds: *Mollugo verticillata*

Chenopodiaceae weeds: *Chenopodium album, Chenopodium ambrosioides, Kochia scoparia, Salsola kali, Atriplex* spp.

Amaranthaceae weeds: *Amaranthus retroflexus, Amaranthus viridis, Amaranthus lividus, Amaranthus spinosus, Amaranthus hybridus, Amaranthus palmeri, Amaranthus patulus,* Waterhemp (*Amaranthus tuberculatus=Amaranthus rudis=Amaranthus tamariscinus*), *Amaranthus blitoides, Amaranthus deflexus, Amaranthus quitensis, Alternanthera philoxeroides, Alternanthera sessilis, Alternanthera tenella*

Papaveraceae weeds: *Papaver rhoeas, Papaver dubium, Argemone mexicana*

Brassicaceae weeds: *Raphanus raphanistrum, Raphanus sativus, Sinapis arvensis, Capsella bursa*-pastoris, *Brassica juncea, Brassica napus, Descurainia pinnata, Rorippa islandica, Rorippa sylvestris, Thlaspi arvense, Myagrum rugosum, Lepidium virginicum, Coronopus didymus*

Capparaceae weeds: *Cleome affinis*

Fabaceae weeds: *Aeschynomene indica, Aeschynomene rudis, Sesbania exaltata, Cassia obtusifolia, Cassia occidentalis, Desmodium tortuosum, Desmodium adscendens, Desmodium illinoense, Trifolium repens, Pueraria lobata, Vicia angustifolia, Indigofera hirsuta, Indigofera truxillensis, Vigna sinensis*

Oxalidaceae weeds: *Oxalis corniculata, Oxalis strica, Oxalis oxyptera*

Geraniaceae weeds: *Geranium carolinense, Erodium cicutarium*

Euphorbiaceae weeds: *Euphorbia helioscopia, Euphorbia maculata, Euphorbia humistrata, Euphorbia esula, Euphorbia heterophylla, Euphorbia brasiliensis, Acalypha australis, Croton glandulosus, Croton lobatus, Phyllanthus corcovadensis, Ricinus communis*

Malvaceae weeds: *Abutilon theophrasti, Sida rhombiforia, Sida cordifolia, Sida spinosa, Sida glaziovii, Sida santaremnensis, Hibiscus trionum, Anoda cristata, Malvastrum coromandelianum*

Onagraceae weeds: *Ludwigia epilobioides, Ludwigia octovalvis, Ludwigia decurre, Oenothera biennis, Oenothera laciniata*

Sterculiaceae weeds: *Waltheria indica*

Violaceae weeds: *Viola arvensis, Viola tricolor*

Cucurbitaceae weeds: *Sicyos angulatus, Echinocystis lobata, Momordica charantia*

Lythraceae weeds: *Ammannia multiflora, Ammannia auriculata, Ammannia coccinea, Lythrum salicaria, Rotala indica*

Elatinaceae weeds: *Elatine triandra, Elatine californica*

Apiaceae weeds: *Oenanthe javanica, Daucus carota, Conium maculatum*

Araliaceae weeds: *Hydrocotyle sibthorpioides, Hydrocotyle ranunculoides*

Ceratophyllaceae weeds: *Ceratophyllum demersum*

Cabombaceae weeds: *Cabomba caroliniana*

Haloragaceae weeds: *Myriophyllum aquaticum, Myriophyllum verticillatum, Myriophyllum spicatum, Myriophyllum heterophyllum*, and the like Sapindaceae weeds: *Cardiospermum halicacabum*

Primulaceae weeds: *Anagallis arvensis*

Asclepiadaceae weeds: *Asclepias syriaca, Ampelamus albidus*

Rubiaceae weeds: *Galium aparine, Galium spurium* var. *echinospermon, Spermacoce latifolia, Richardia brasiliensis, Borreria alata*

Convolvulaceae weeds: *Ipomoea nil, Ipomoea hederacea, Ipomoea purpurea, Ipomoea hederacea* var. integriuscula, *Ipomoea lacunosa, Ipomoea triloba, Ipomoea acuminata, Ipomoea hederifolia, Ipomoea coccinea, Ipomoea quamoclit, Ipomoea grandifolia, Ipomoea aristolochiafolia, Ipomoea cairica, Convolvulus arvensis, Calystegia hederacea, Calystegia japonica, Merremia hedeacea, Merremia aegyptia, Merremia cissoides, Jacquemontia tamnifolia*

Boraginaceae weeds: *Myosotis arvensis*

Lamiaceae weeds: *Lamium purpureum, Lamium amplexicaule, Leonotis nepetaefolia, Hyptis suaveolens, Hyptis lophanta, Leonurus sibiricus, Stachys arvensis*

Solanaceae weeds: *Datura stramonium, Solanum nigrum, Solanum americanum, Solanum ptycanthum, Solanum sarrachoides, Solanum rostratum, Solanum aculeatissimum, Solanum sisymbriifolium, Solanum carolinense, Physalis angulata, Physalis subglabrata, Nicandra physaloides*

Scrophulariaceae weeds: *Veronica hederaefolia, Veronica persica, Veronica arvensis, Lindernia procumbens, Lindernia dubia, Lindernia angustifolia, Bacopa rotundifolia, Dopatrium junceum, Gratiola japonica*

Plantaginaceae weeds: *Plantago asiatica, Plantago lanceolata, Plantago major, Callitriche palustris*

Asteraceae weeds: *Xanthium pensylvanicum, Xanthium occidentale, Xanthium italicum, Helianthus annuus, Matricaria chamomilla, Matricaria perforata, Chrysanthemum segetum, Matricaria matricarioides, Artemisia princeps, Artemisia vulgaris, Artemisia verlotorum, Solidago altissima, Taraxacum officinale, Galinsoga ciliata, Galinsoga parviflora, Senecio vulgaris, Senecio brasiliensis, Senecio grisebachii, Conyza bonariensis, Conyza smatrensis, Conyza canadensis, Ambrosia artemisiaefolia, Ambrosia trifida, Bidens tripartita, Bidens pilosa, Bidens frondosa, Bidens subalternans, Cirsium arvense, Cirsium vulgare, Silybum marianum, Carduus nutans, Lactuca serriola, Sonchus oleraceus, Sonchus asper, Wedelia glauca, Melampodium perfoliatum, Emilia sonchifolia, Tagetes minuta, Blainvillea latifolia, Tridax procumbens, Porophyllum ruderale, Acanthospermum australe, Acanthospermum hispidum, Cardiospermum halicacabum, Ageratum conyzoides, Eupatorium perfoliatum, Eclipta alba, Erechtites hieracifolia, Gamochaeta spicata, Gnaphalium spicatum, Jaegeria hirta, Parthenium hysterophorus, Siegesbeckia orientalis, Soliva sessilis, Eclipta prostrata, Eclipta alba, Centipeda minima*

Alismataceae weeds: *Sagittaria pygmaea, Sagittaria trifolia, Sagittaria sagittifolia, Sagittaria montevidensis, Sagittaria aginashi, Alisma canaliculatum, Alisma plantago-aquatica*

Limnocharitaceae weeds: *Limnocharis flava*

Hydrocharitaceae weeds: *Limnobium spongia, Hydrilla verticillata, Najas guadalupensis*

Araceae weeds: *Pistia stratiotes*

Lemnaceae weeds: *Lemna aoukikusa, Spirodela polyrhiza, Wolffia* spp

Potamogetonaceae weeds: *Potamogeton distinctus, Potamogeton crispus, Potamogeton illinoensis, Stuckenia pectinata*, and the like Liliaceae weeds: *Allium canadense, Allium vineale, Allium macrostemon*

Pontederiaceae weeds: *Eichhornia crassipes, Heteranthera limosa, Monochoria korsakowii, Monochoria vaginalis*

Commelinaceae weeds: *Commelina communis, Commelina bengharensis, Commelina erecta, Murdannia keisak*

Poaceae weeds: *Echinochloa crus-galli, Echinochloa oryzicola, Echinochloa crus-galli* var formosensis, *Echinochloa oryzoides, Echinochloa colona, Echinochloa crus-pavonis, Setaria viridis, Setaria faberi, Setaria glauca, Setaria geniculata, Digitaria ciliaris, Digitaria sanguinalis, Digitaria horizontalis, Digitaria insularis, Eleusine indica, Poa annua, Poa trivialis, Poa pratensis, Alospecurus aequalis, Alopecurus myosuroides, Avena fatua, Sorghum halepense, Sorghum vulgare, Agropyron repens, Lolium multiflorum, Lolium perenne, Lolium rigidum, Bromus catharticus, Bromus sterilis, Bromus japonicus, Bromus secalinus, Bromus tectorum, Hordeum jubatum, Aegilops cylindrica, Phalaris arundinacea, Phalaris minor, Apera spica-venti, Panicum dichotomiflorum, Panicum texanum, Panicum maximum, Brachiaria platyphylla, Brachiaria ruziziensis, Brachiaria plantaginea, Brachiaria decumbens, Brachiaria brizantha, Brachiaria humidicola, Cenchrus echinatus, Cenchrus pauciflorus, Eriochloa villosa, Pennisetum setosum, Chloris gayana, Chlorisvirgata, Eragrostis pilosa, Rhynchelitrum repens, Dactyloctenium aegyptium, Ischaemum rugosum, Isachne globosa, Oryza sativa, Paspalum notatum, Paspalum maritimum, Paspalum distichum, Pennisetum clandestinum, Pennisetum setosum, Rottboellia cochinchinensis, Leptochloa chinensis, Leptochloa fascicularis, Leptochloa filiformis, Leptochloa panicoides, Leersia japonica, Leersia sayanuka, Leersia oryzoides, Glyceria leptorrhiza, Glyceria acutiflora, Glyceria maxima, Agrostis gigantea, Agrostis stolonifera, Cynodon dactylon, Dactylis glomerata, Eremochloa ophiuroides, Festuca arundinacea, Festuca rubra, Imperata cylindrica, Miscanthus sinensis, Panicum virgatum, Zoysia japonica*

Cyperaceae weeds: *Cyperus microiria, Cyperus iria, Cyperus compressus, Cyperus difformis, Cyperus flaccidus, Cyperus globosus, Cyperus nipponics, Cyperus odoratus, Cyperus serotinus, Cyperus rotundus, Cyperus esculentus, Kyllinga gracillima, Kyllinga brevifolia, Fimbristylis miliacea, Fimbristylis dichotoma, Eleocharis acicularis, Eleocharis kuroguwai, Schoenoplectiella hotarui, Schoenoplectiella juncoides, Schoenoplectiella wallichii, Schoenoplectiella mucronatus, Schoenoplectiella triangulatus, Schoenoplectiella nipponicus, Schoenoplectiella triqueter, Bolboschoenus koshevnikovii, Bolboschoenus fluviatilis*

Equisetaceae weeds: *Equisetum arvense, Equisetum palustre*

Salviniaceae weeds: *Salvinia natans*

Azollaceae weeds: *Azolla japonica, Azolla imbricata*

Marsileaceae weeds: *Marsilea quadrifolia*

Others: *Pithophora, Cladophora, Bryophyta, Marchantiophyta, Anthocerotophyta, Cyanobacteria, Pteridophyta*, sucker of perennial crops (pomaceous fruits, nut trees, citruses, Humulus lupulus, grapes, and the like).

In the above-mentioned weeds, mutations within the species are not particularly limited. That is, the weeds include weeds having reduced sensitivity to a specific herbicide. The reduced sensitivity may be attributed to a mutation at a target site (target site mutation), or may be attributed to any factors other than the target site mutation (non-target site mutation). Examples of the factor of the reduced sensitivity due to a non-target site mutation include increased metabolism, malabsorption, translocation dysfunction, and excretion to out of system. Examples of the factor of the increased metabolism include the enhanced activity of a metabolizing enzyme such as cytochrome P450 monooxygenase, aryl acylamidase, esterase, or glutathione S-transferase. Examples of the excretion to out of system include transport to the vacuole by an ABC transporter. Examples of the weeds having reduced sensitivity due to a target site mutation include weeds having any one of, or two or more of the following amino acid substitutions in the ALS gene. Ala122Thr, Ala122Val, Ala122Tyr, Pro197Ser, Pro197His, Pro197Thr, Pro197Arg, Pro197Leu, Pro197Gln, Pro197Ala, Pro197Ile, Ala205Val, Ala205Phe, Asp376Glu, Arg377His, Trp574Leu, Trp574Gly, Trp574Met, Ser653Thr, Ser653Thr, Ser653Asn, Ser635Ile, Gly654Glu, and Gly645Asp. Similarly, examples of the weeds having reduced sensitivity due to a target site mutation include weeds having any one of, or two or more of the following amino acid substitutions in the ACCase gene. Ile1781Leu, Ile1781Val, Ile1781Thr, Trp1999Cys, Trp1999Leu, Ala2004Val, Trp2027Cys, Ile2041Asn, Ile2041Val, Asp2078Gly, Cys2088Arg, Gly2096Ala, and Gly2096Ser.

Similarly, as an example of the weeds having reduced sensitivity due to a target site mutation, PPO inhibitor-resistant weeds having one or more mutations selected from an Arg128Leu mutation, an Arg128Met mutation, an Arg128Gly mutation, an Arg128His mutation, a Gly210 deletion mutation, and a Gly399Ala mutation in PPO. The word "PPO" means protoporphyrinogen oxidase. Weeds usually have PPO1 and PPO2 in PPO, and the above-mentioned mutations maybe present in either PPO1 or PPO2 or in both. The case where weeds have the mutations in PPO2 is preferable. For example, the word "Arg128Met" means that the mutation is present in the 128th (the number is standardized with PPO2 of *Amaranthus palmeri*) amino acid. In PPO2 of *Ambrosia artemisiaefolia*, the mutation corresponds to a mutation in the 98th amino acid (Weed Science 60, 335-344) and is known as Arg98Leu. In this case, Arg98 is equivalent to Arg128 according to the present invention. The Arg128Met mutation and the Arg128Gly mutation in the PPO of the weed to be controlled in the present invention are known in *Amaranthus palmeri* (Pest Management Science 73, 1559-1563), the Arg128His mutation is known in *Lolium rigidum* (WSSA annual meeting, 2018), and the Gly399Ala mutation is known in *Amaranthus palmeri* (WSSA annual meeting, 2018). In the present invention, the above-mentioned reported resistant weeds are particularly effectively controlled, but particularly effectively controlled weeds are not limited thereto. That is, other weeds having the amino acid mutation are similarly controlled. Not only *Amaranthus palmeri* having an Arg128Leu mutation, an Arg128Met mutation, an Arg128Gly mutation, an Arg128His mutation, a Gly210 deletion mutation, or a Gly399Ala mutation, but also, for example, waterhemp having the above-mentioned mutation, *Ambrosia artemisiaefolia* having the above-mentioned mutation, *Lolium rigidum* having the above-mentioned mutation, *Lolium multiflorum* having the above-mentioned mutation, and

*Euphorbia heterophylla* having the above-mentioned mutation are effectively controlled.

Similarly, examples of the weeds having reduced sensitivity due to a target site mutation include weeds having an amino acid substitution such as Thr102Ile, Pro106Ser, Pro106Ala, or Pro106Leu in the EPSP gene. In particular, *Eleusine indica, Lolium multiflorum, Lolium rigidum, Digitaria insularis, waterhemp, Echinochloa colona*, and the like which are resistant to glyphosate and have one or both of the mutations are effectively controlled. Similarly, examples of the weeds having reduced sensitivity due to a target site include weeds having increased copies of the EPSP gene, and *Amaranthus palmeri*, waterhemp, *Kochia scoparia*, and the like which are resistant to glyphosate and have the mutation are particularly effectively controlled. *Conyza canadensis, Conyza smatrensis, and Conyza bonariensis* which are resistant to glyphosate in which an ABC transporter is involved are also effectively controlled.

In the cultivation of a crop according to the present invention, plant nutritional management in general cultivation of a crop can be performed. The fertilization system may be based on Precision Agriculture or may be conventionally uniform one. In addition, a nitrogen-fixing bacterium or a mycorrhizal fungus can be inoculated in combination with seed treatment.

EXAMPLES

Hereinafter, the present invention will be described by Examples, but the present invention is not limited thereto.

First, evaluation criteria are shown for the herbicidal efficacy and the crop injury described in Examples below.

[Herbicidal Efficacy and Crop Injury]

In the evaluation of herbicidal efficacy, the efficacy is defined as “0” if the state of budding or growth of test weeds indicates little or no difference compared to that in the case of no treatment at the time of the investigation. The efficacy is defined as “100” if test weeds are completely killed or the budding or growth of test weeds is completely prevented. Hence, the efficacy is classified as “0 to 100”.

In the evaluation of crop injuries, the injury is defined as “harmless” if a harmful effect is little observed. The injury is defined as “small” if a mild harmful effect is observed. The injury is defined as “medium” if a moderate harmful effect is observed. The injury is defined as “large” if a severe harmful effect is observed.

Example 1

Weeds (*Amaranthus palmeri, waterhemp, Ambrosia artemisiaefolia, Ambrosia trifida, Conyza canadensis, Chenopodium album, Kochia scoparia, Echinochloa crus-galli*, and *Setaria faberi*) are sown in a plastic pot. On the same day, a mixed spray liquid is applied on the soil surface at the spray volume of 200 L/ha so that the application rate of trifludimoxazin may be 25, 50, 100, or 200 g/ha and the application rate of ZIDUA (pyroxasulfone 85% water dispersible granule, manufactured by BASF SE) may be 70, 140, or 280 g/ha (1, 2, or 4 ounces/acre). Then the weeds are cultivated in a greenhouse, and at 7 days after the application, soybeans are sown. Fourteen days after seeding the soybeans, the effect on the weeds and the crop injury on the soybeans are investigated. A synergistic weed controlling effect compared to the single use of each compound is confirmed.

Example 2

Weeds (*Amaranthus palmeri, waterhemp, Ambrosia artemisiaefolia, Ambrosia trifida, Conyza canadensis, Chenopodium album, Kochia scoparia, Echinochloa crus-galli*, and *Setaria faberi*) and soybeans are sown in a plastic pot. On the same day, the treatment amount of trifludimoxazin sows Nubie and *Setaria faberi*). On the same day, a mixed spray liquid is applied on the soil surface at the sprayed amount of 200 L/ha so that the application rate of trifludimoxazin may be 25, 50, 100, or 200 g/ha and the application rate of Sharpen (saflufenacil 29.7% wettable powder, manufactured by BASF SE) may be 73 ml/ha (1 fluid ounce/acre). Then the weeds and the soybeans are cultivated in a greenhouse, and 21 days after the application, the effect on the weeds and the crop injury on the soybeans are investigated. A synergistic weed controlling effect compared to the single use of each compound is confirmed.

Example 3

Weeds (*Amaranthus palmeri, waterhemp, Ambrosia artemisiaefolia, Ambrosia trifida, Conyza canadensis, Chenopodium album, Kochia scoparia, Echinochloa crus-galli*, and *Setaria faberi*) and soybeans are sown in a plastic pot. On the same day, a mixed spray liquid is applied on the soil surface at the spray volume of 200 L/ha so that the application rate of trifludimoxazin may be 25, 50, 100, or 200 g/ha and the application rate of Valor SX (flumioxazin 51% wettable powder, manufactured by Valent U.S.A. LLC) may be 140 g/ha (2 ounces/acre). Then the weeds and the soybeans are cultivated in a greenhouse, and 21 days after the application, the effect on the weeds and the crop injury on the soybeans are investigated. A synergistic weed controlling effect compared to the single use of each compound is confirmed.

Examples 4 to 6

Tests are carried out in the same manner as in Examples 1 to 3 except that the soybeans are replaced with corns or cottons.

Example 7

Weeds (*Amaranthus palmeri, waterhemp, Ambrosia artemisiaefolia, Ambrosia trifida, Conyza canadensis, Chenopodium album, Kochia scoparia, Echinochloa crus-galli*, and *Setaria faberi*) are sown in a plastic pot. Then the weeds are cultivated in a greenhouse, and 21 days after the sowing, a mixed spray liquid is applied to the foliage at the spray volume of 200 L/ha so that the application rate of trifludimoxazin may be 25, 50, 100, or 200 g/ha and the application rate of RoundupWeatherMax (glyphosate-potassium salt 660 g/L, manufactured by Monsanto Company) may be 2.338 L/ha (32 fluid ounces/acre). The weeds are further cultivated in the greenhouse, and 7 days and 14 days after the treatment, the effect on the weeds is investigated. A synergistic weed controlling effect compared to the single use of each compound is confirmed.

Example 8

Weeds (*Amaranthus palmeri, waterhemp, Ambrosia artemisiaefolia, Ambrosia trifida, Conyza canadensis, Chenopodium album, Kochia scoparia, Echinochloa crus-galli*, and *Setaria faberi*) are sown in a plastic pot. On the same day, a spray liquid which is prepared so that the application rate of trifludimoxazin may be 25, 50, 100, or 200 g/ha is applied on the soil surface at the spray volume of 200 L/ha. Then the weeds are cultivated in a greenhouse, and 7 days after the application, soybeans are sown, and a spray liquid which is prepared so that the application rate of ZIDUA (pyroxasulfone 85% water dispersible granule, manufactured by BASF SE) may be 70, 140, or 280 g/ha (1, 2, or 4 ounces/acre) is applied at the spray volume of 200 L/ha. Further 14 days after the sowing of soybeans, the effect on the weeds and the crop injury on the soybeans are investigated. A synergistic weed controlling effect compared to the single use of each compound is confirmed.

Example 9

Weeds (*Amaranthus palmeri, waterhemp, Ambrosia artemisiaefolia, Ambrosia trifida, Conyza canadensis, Chenopodium album, Kochia scoparia, Echinochloa crus-galli*, and *Setaria faberi*) are sown in a plastic pot. On the same day, a spray liquid which is prepared so that the application rate of trifludimoxazin may be 25, 50, 100, or 200 g/ha is applied on the soil surface at the spray volume of 200 L/ha. Then the weeds are cultivated in a greenhouse, and 7 days after the application, soybeans are sown, and a spray liquid which is prepared so that the application rate of Sharpen (saflufenacil 29.7% wettable powder, manufactured by BASF SE) may be 73 ml/ha (1 fluid ounce/acre) is applied at the spray volume of 200 L/ha. Further 14 days after the sowing of soybeans, the effect on the weeds and the crop injury on the soybeans are investigated. A synergistic weed controlling effect compared to the single use of each compound is confirmed.

Example 10

Weeds (*Amaranthus palmeri, waterhemp, Ambrosia artemisiaefolia, Ambrosia trifida, Conyza canadensis, Chenopodium album, Kochia scoparia, Echinochloa crus-galli*, and *Setaria faberi*) are sown in a plastic pot. On the same day, a spray liquid which is prepared so that the application rate of trifludimoxazin may be 25, 50, 100, or 200 g/ha is applied on the soil surface at the spray volume of 200 L/ha. Then the weeds are cultivated in a greenhouse, and 7 days after the application, soybeans are sown, and a spray liquid which is prepared so that the application rate of Valor SX (flumioxazin 51% wettable powder, manufactured by Valent U.S.A. LLC) may be 140 g/ha (2 ounces/acre) is applied at the spray volume of 200 L/ha. Further 14 days after the sowing of soybeans, the effect on the weeds and the crop injury on the soybeans are investigated. A synergistic weed controlling effect compared to the single use of each compound is confirmed.

Examples 11 to 1349

Tests are carried out in the same manner as in Examples 8 to 1046 except that RoundupPowerMax (glyphosate-potassium salt 660 g/L, manufactured by Monsanto Company) is additionally used in the application of trifludimoxazin so that the application rate of RoundupPowerMax may be 2.338 L/ha (32 fluid ounces/acre, 1,543 g/ha as glyphosate-potassium salt).

Example 14

Weeds (*Amaranthus palmeri, waterhemp, Ambrosia artemisiaefolia, Ambrosia trifida, Conyza canadensis, Chenopodium album, Kochia scoparia, Echinochloa crus-galli*, and *Setaria faberi*) are sown in a plastic pot. On the same day, a spray liquid which is prepared so that the application rate of trifludimoxazin may be 25, 50, 100, or 200 g/ha is applied on the soil surface at the spray volume of 200 L/ha. Then the weeds are cultivated in a greenhouse, and 7 days after the application, soybeans are sown, and 14 days after the sowing, a spray liquid which is prepared so that the application rate of RoundupWeatherMax (glyphosate-potassium salt 660 g/L, manufactured by Monsanto Company) may be 2.338 L/ha (32 fluid ounces/acre) is applied at the spray volume of 200 L/ha. Further 14 days later (28 days after the sowing), the effect on the weeds and the crop injury on the soybeans are investigated. A synergistic weed controlling effect compared to the single use of each compound is confirmed.

Example 15

A test is carried out in the same manner as in Example except that RoundupPowerMax (glyphosate-potassium salt 660 g/L, manufactured by Monsanto Company) is additionally used in the application of trifludimoxazin so that the application rate of RoundupPowerMax may be 2.338 L/ha (32 fluid ounces/acre, 1,543 g/ha as a glyphosate-potassium salt).

Examples 16 to 23

Tests are carried out in the same manner as in Examples 8 to 15 except that the soybeans are replaced with corns or cottons.

Examples 24 to 46

In the case where any crops are used in Examples 1 to 23, tests are carried out in the same manner as in the Examples except that the crops used in the Examples are replaced with crops having a Roundup Ready 2 Xtend trait.

Examples 47 to 69

In the case where any crops are used in Examples 1 to 23, tests are carried out in the same manner as in the Examples except that the crops used in the Examples are replaced with the crops having both a Roundup Ready 2 Xtend trait and a PPO inhibitor-tolerant trait due to foreign PPO having lower affinity for the PPO inhibitor than the endogenous PPO of the crops by genetic engineering.

INDUSTRIAL APPLICABILITY

Weeds can be efficiently controlled by the herbicidal composition according to the present invention.

The invention claimed is:

1. A herbicidal composition comprising: trifludimoxazin, saflufenacil, and pyroxasulfone wherein the weight ratio of trifludimoxazin to saflufenacil is about 1:2, and the weight ratio of trifludimoxazin to pyroxasulfone is about 1:10 to about 1:15.

* * * * *